United States Patent [19]

Nouvertné et al.

[11] Patent Number: 4,515,918

[45] Date of Patent: May 7, 1985

[54] THERMOPLASTIC MOULDING COMPOSITIONS BASED ON POLYCARBONATE, POLYALKYLENE TEREPHTHALATE AND, OPTIONALLY, ONE OR MORE POLYMERS

[75] Inventors: Werner Nouvertné; Volker Serini; Dieter Neuray; Rudolf Binsack, all of Krefeld; Hans-Georg Gehrke, Odenthal; Dieter Rempel, Leverkusen; Sivara Krishnai, Moers, all of Fed. Rep. of Germany

[73] Assignee: Bayer Aktiengesellschaft, Leverkusen, Fed. Rep. of Germany

[21] Appl. No.: 602,596

[22] Filed: Apr. 20, 1984

Related U.S. Application Data

[63] Continuation of Ser. No. 518,071, Jul. 28, 1983, abandoned, which is a continuation of Ser. No. 375,390, May 6, 1982, abandoned.

[30] Foreign Application Priority Data

May 12, 1981 [DE] Fed. Rep. of Germany ....... 3118697

[51] Int. Cl.³ .................. C08L 67/02; C08L 69/00
[52] U.S. Cl. .................. 524/504; 524/613; 525/67; 525/92; 525/147
[58] Field of Search .................. 525/67; 524/504

[56] References Cited

U.S. PATENT DOCUMENTS

| | | | |
|---|---|---|---|
| 3,218,372 | 11/1965 | Okamura | 525/439 |
| 3,864,428 | 2/1975 | Nakamura | 525/310 |
| 4,034,016 | 5/1977 | Baron | 525/439 |
| 4,044,073 | 8/1977 | Baron | 525/437 |
| 4,056,504 | 1/1977 | Grundmeier et al. | 525/439 |
| 4,105,711 | 8/1978 | Hardt et al. | 525/146 |
| 4,113,692 | 9/1978 | Wambach | 525/439 |
| 4,172,103 | 10/1979 | Serini et al. | 525/76 |
| 4,218,545 | 8/1980 | Serini et al. | 525/92 |
| 4,257,937 | 3/1981 | Cohen | 525/148 |
| 4,264,487 | 4/1981 | Fromuth | 525/68 |
| 4,280,948 | 7/1981 | Dieck | 525/67 |
| 4,292,233 | 9/1981 | Binsack | 525/69 |

FOREIGN PATENT DOCUMENTS 1508562  4/1978  United Kingdom .

Primary Examiner—John C. Bleutge
Assistant Examiner—Patricia Short
Attorney, Agent, or Firm—Connolly and Hutz

[57] ABSTRACT

Moulding compositions of polycarbonate, polyalkylene terephthalate and, optionally, polymer having a glass transition temperature below −20° C. may be processed to form particularly low-distortion mouldings when the polycarbonate consists at least partly of o,o,o′-,o′-tetramethyl-besphenol-polycarbonate.

5 Claims, No Drawings

THERMOPLASTIC MOULDING COMPOSITIONS BASED ON POLYCARBONATE, POLYALKYLENE TEREPHTHALATE AND, OPTIONALLY, ONE OR MORE POLYMERS

This application is a continuation of Ser. No. 518,071, filed July 28, 1983, now abandoned, which was a continuation of Ser. No. 375,390, filed May 6, 1982, now abandoned.

This invention relates to thermoplastic moulding compositions containing at least one aromatic polycarbonate, at least one polyalkylene terephthalate and, optionally, one or more polymers.

Thermoplastic moulding compositions based on polycarbonate, polyalkylene terephthalate and, optionally, graft polymer are known; cf., for example, DE-OS No. 2,622,414 (=U.S. Pat. No. 4,044,073), DE-AS No. 1,187,793 (=U.S. Pat. No. 3,218,372), DE-AS No. 2,343,609 (=U.S. Pat. No. 3,864,428), published European Patent Application Nos. 0 020 605 and 0 025 920. They are said to be distinguished above all by good processing properties, high compatibility with other additives and high impact strength.

Although the above moulding compositions have many positive properties, they are not suitable for certain specialised applications. In the event of prolonged temperature stressing, mouldings produced from them, particularly thin mouldings, show a tendency towards distortion which makes them unsuitable for heat-resistant components, for example housing components in the engine compartment of motor vehicles or in temperature-stressed domestic appliances.

Accordingly, an object of the present invention is to provide moulding compositions based on polycarbonate and polyalkylene terephthalate which are more suitable for these applications, but which largely retain the well-known favourable physical and chemical properties of polycarbonate/polyalkylene terephthalate mixtures.

It has now surprisingly been found that polycarbonate/polyalkylene terephthalate mixtures of when the polycarbonate component consists completely or partly of o,o,o',o'-tetramethyl bisphenol polycarbonate satisfy the above-mentioned requirements in an outstanding manner. In particular, it appears surprising that even very small quantities of tetramethyl bisphenol polycarbonate have an extremely positive effect upon distortion behaviour.

The present invention relates to thermoplastic moulding compositions comprising:
(A) from 1 to 99 parts, by weight, preferably from 20 to 80 parts, by weight, more preferably from 30 to 60 parts, by weight, of polyalkylene terephthalate;
(B) from 1 to 99 parts, by weight, preferably from 20 to 80 parts, by weight, more preferably from 40 to 70 parts, by weight, of aromatic polycarbonate; and
(C) from 0 to 30 parts, by weight, preferably from 1 to 20 parts, by weight, more preferably from 3 to 12 parts, by weight, of polymer having a glass transition temperature below $-20°$ C.;
the quantities of components (A), (B) and (C) totalling 100 parts, by weight;
characterised in that the polycarbonate (B) consists at least partly of o,o,o',o'-tetramethyl bisphenol polycarbonate.

Polyalkylene terephthalates (A) suitable for the purposes of the present invention are reaction products of aromatic dicarboxylic acids or reactive derivatives thereof, for example dimethyl esters or anhydrides, and aliphatic, cycloaliphatic or araliphatic diols and mixtures of these reaction products.

Preferred polyalkylene terephthalates (A) may be obtained by known methods (Kunststoff-Handbuch, Vol. VIII, pages 695 et. seq., Carl Hanser Verlag, Munich 1973) from terephthalic acid or reactive derivatives thereof and aliphatic or cycloaliphatic diols containing from 2 to 10 carbon atoms.

Preferred polyalkylene terephthalates (A) contain at least 80 mole percent, preferably at least 90 mole percent, based on the dicarboxylic acid component, of terephthalic acid residues and at least 80 mole percent, preferably at least 90 mole percent, based on the diol component, of ethylene glycol and/or 1,4-butane diol residues.

In addition to terephthalic acid residues, the preferred polyalkylene terephthalates (A) may contain up to 20 mole percent of residues of other aromatic dicarboxylic acids containing from 8 to 14 carbon atoms or of aliphatic dicarboxylic acids containing from 4 to 12 carbon atoms, such as residues of phthalic acid, isophthalic acid, naphthalene-2,6-dicarboxylic acid, 4,4'-diphenyl dicarboxylic acid, succinic acid, adipic acid, sebacic acid, azelaic acid and cyclohexane diacetic acid.

In addition to ethylene glycol and/or 1,4-butane diol residues, the preferred polyalkylene terephthalates (A) may contain up to 20 mole percent of other aliphatic diols containing from 3 to 12 carbon atoms or of cycloaliphatic diols containing from 6 to 21 carbon atoms, for example residues of 1,3-propane diol, 2-ethyl-1,3-propane diol, neopentyl glycol, 1,5-pentane diol, 1,6-hexane diol, cyclohexane-1,4-dimethanol, 3-methyl-2,4-pentane diol, 2-methyl-2,4-pentane diol, 2,2,4-trimethyl-1,3- and 1,6-pentane diol, 2-ethyl-1,3-hexane diol, 2,2-diethyl-1,3-propane diol, 2,5-hexane diol, 1,4-di-($\beta$-hydroxyethoxy)-benzene, 2,2-bis-(4-hydroxycyclohexyl)-propane, 2,4-dihydroxy-1,1,3,3-tetramethyl cyclobutane, 2,2-bis-(3-$\beta$-hydroxy-ethoxy-phenyl)-propane and 2,2-bis-(4-hydroxy-propoxy-phenyl)-propane (German Offenlegungsschrift Nos. 2,407,674; 2,407,776 and 2,715,932).

The polyalkylene terephthalates (A) may be branched by the incorporation of relatively small quantities of tri- or tetra-hydric alcohols or of tri- or tetra-basic carboxylic acids of the type described for example, in DE-OS No. 1,900,270 and in U.S. Pat. No. 3,692,744. Examples of preferred branching agents are trimesic acid, trimellitic acid, trimethylol ethane and trimethylol propane and pentaerythritol. It is advisable to use no more than 1 mole percent of the branching agent, based on the acid component.

Particularly preferred polyalkylene terephthalates (A) are polyalkylene terephthalates which have been produced solely from terephthalic acid and reactive derivatives thereof, for example dialkyl esters, and ethylene glycol and/or 1,4-butane diol, and mixtures of these polyalkylene terephthalates.

Other preferred polyalkylene terephthalates (A) are copolymers produced from at least two of the above-mentioned acid components and/or from at least two of the above-mentioned alcohol components. Particularly preferred copolyesters are poly-(ethylene glycol/1,4-butane diol)-terephthalates.

The polyalkylene terephthalates preferably used as component (A) generally have an intrinsic viscosity of from 0.4 to 1.5 dl/g, preferably from 0.5 to 1.3 dl/g, more preferably from 0.6 to 1.2 dl/g, as measured in phenol/o-dichlorobenzene (1:1 part, by weight) at 25° C.

In the context of the present invention, aromatic polycarbonates (B) are homopolycarbonates, copolycarbonates and mixtures of these polycarbonates based, for example, on at least one of the following diphenols: hydroquinone, resorcinol, dihydroxydiphenyl, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphoxides, bis-(hydroxyphenyl)-sulphones and α,α'-bis-(hydroxyphenyl)-diisopropyl benzenes and nucleus-alkylated and nucleus-halogenated derivatives thereof. These and other suitable diphenols are described, for example, in U.S. Pat. Nos. 3,028,365; 3,275,601; 3,148,172; 3,062,781; 2,991,273; 3,271,367; 2,999,835; 2,970,131 and 2,999,846, in DE-OS Nos. 1,570,703; 2,063,050; 2,063,052; 2,211,956 and 2,211,957 in FR-PS No. 1,561,518 and in H. Schnell's book entitled "Chemistry and Physics of Polycarbonates", Interscience Publishers, New York, 1964.

Preferred diphenols are, for example, 4,4'-dihydroxydiphenyl, 2,4-bis-(4-hydroxyphenyl)-2-methyl butane, α,α'-bis-(4-hydroxyphenyl)-p-diisopropyl benzene, 2,2-bis-(3-methyl-4-hydroxyphenyl)-propane and 2,2-bis-(3-chloro-4-hydroxyphenyl)-propane. Particularly preferred diphenols are, for example, 2,2-bis-(4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

Preferred o,o,o',o'-tetramethyl bisphenol polycarbonates are, for example, bis-(3,5-dimethyl-4-hydroxyphenyl), bis-(3,5-dimethyl-4-hydroxyphenyl)-alkanes, bis-(3,5-dimethyl-4-hydroxyphenyl)-cycloalkanes, bis-(3,5-dimethyl-4-hydroxyphenyl)-sulphides, bis-(3,5-dimethyl-4-hydroxyphenyl)-ethers, bis-(3,5-dimethyl-4-hydroxyphenyl)-ketones, bis-(3,5-dimethyl-4-hydroxyphenyl)-sulphoxides, α,α'-bis-(3,5-dimethyl-4-hydroxyphenyl)-diisopropyl benzenes and nucleus-halogenated derivatives thereof, more particularly bis-(3,5-dimethyl-4-hydroxyphenyl)-methane, 2,2-bis-(3,5-dimethyl-4-hydroxyphenyl)-propane, 2,4-bis-(3,5-dimethyl-4-hydroxyphenyl)-2-methyl butane, 1,1-bis-(3,5-dimethyl-4-hydroxyphenyl)-cyclohexane, α,α'-bis-(3,5-dimethyl-4-hydroxyphenyl)-p-diisopropyl benzene and bis-(3,5-dimethyl-4-hydroxyphenyl)-sulphone.

Particularly preferred o,o,o',o'-tetramethyl bisphenol polycarbonates are those of which the diphenol component consists solely of 2,2-bis-(3,5-dimethyl-4-hydroxyphenyl)-propane. From 0.5 to 20%, by weight, preferably from 1 to 7%, by weight, of this compound may optionally be replaced by 1,1,3,4,6-pentamethyl-3-(3,5-dimethyl-4-hydroxyphenyl)-indan-5-ol which corresponds to the following formula (1):

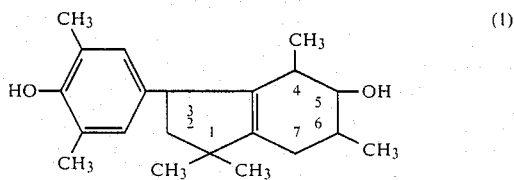

The aromatic polycarbonates (B) may be branched by the incorporation of small quantities, preferably from 0.05 to 2 mole percent (based on the diphenols used), of at least trifunctional compounds, for example compounds containing three or more phenolic hydroxyl groups.

The aromatic polycarbonates (B) should generally have average molecular weights, $\overline{M}_w$, of from 10,000 to more than 200,000, preferably from 20,000 to 80,000, as determined by measurement of the relative viscosity in dichloromethane at 25° C. using a concentration of 0.5%, by weight.

Small quantities of low molecular weight polycarbonates, for example having an average degree of polycondensation of from 2 to 20, may also be added to an mixed with the high molecular weight polycarbonates having an average molecular weight, $\overline{M}_w$, of 10,000 to 200,000.

The molecular weight, $\overline{M}_w$, of the polycarbonates (B) is adjusted in known manner by chain-terminators, such as phenol, halo-phenols or alkyl phenols, used in the calculated quantities.

In general, from 1 to 100%, by weight, of the aromatic polycarbonates (B) consist of tetramethyl bisphenol carbonate units, based on the sum of all the bisphenol carbonate units; in other words, mixtures and cocondensates are treated the same for calculating purposes, so that a polycarbonate consisting of 50%, by weight, of bisphenol-A-carbonate units and 50%, by weight, of tetramethyl bisphenol-A-carbonate units is calculated as a mixture of 50% by weight, of bisphenol-A-polycarbonate and 50%, by weight, of tetramethyl bisphenol-A-polycarbonate.

In view of the broad scope for the possible tetramethyl bisphenol polycarbonate content of the aromatic polycarbonate (B), it appears obvious that the properties of the mixtures according to the present invention vary with the content of tetramethyl bisphenol polycarbonate. If importance is attached primarily to minimal distortion, it is sufficient for from 2 to 20%, by weight, of the aromatic polycarbonate (B) to consist of tetramethyl bisphenol polycarbonate. Moulding compositions according to the present invention, from 80 to 100%, by weight, of whose aromatic polycarbonates (B) consist of tetramethyl bisphenol polycarbonate, show particularly high resistance to hydrolysis and dimensional stability to heat. Moulding compositions according to the present invention, between 20 and 80%, by weight, of whose aromatic polycarbonate consists of tetramethyl bisphenol polycarbonate, are characterized by a combination of the above-mentioned advantageous properties.

Where the aromatic polycarbonate (B) consists of tetramethyl bisphenol polycarbonate, the moulding compositions according to the present invention contain three resin components. They preferably consist of:
(A) from 5 to 95 parts, by weight, preferably from 20 to 80 parts, by weight, more preferably from 40 to 60 parts, by weight, of polyalkylene terephthalate;
(B) from 5 to 95 parts, by weight, preferably from 20 to 80 parts, by weight, more preferably from 40 to 60 parts, by weight, of o,o,o',o'-tetramethyl bisphenol polycarbonate; and
(C) from 1 to 30 parts, by weight, preferably from 5 to 20 parts, by weight, of polymer having a glass transition temperature below −20° C.,
the quantities of components (A), (B) and (C) totalling 100 parts, by weight.

Compared with a moulding composition according to the present invention which additionally contains another bisphenol polycarbonate, of which the bisphenol units in the o-position are not methylated, the above-mentioned three-component mixture shows lower impact strength, but greater dimensional stability to heat and lower shrinkage, which is particularly important for glass-fibre-reinforced products.

The polymers (C) comprise copolymers, particularly graft copolymers, having elastomeric properties which may be obtained essentially from at least two of the following monomers: chloroprene, butadiene, isoprene, isobutene, styrene, acrylonitrile, ethylene, propylene, vinyl acetate and (meth)acrylic acid esters containing from 1 to 18 carbon atoms in the alcohol component; i.e. polymers of the type described, for example, in "Methoden der Organischen Chemie" (Houben-Weyl), Vol. 14/1, Georg Thieme Verlag, Stuttgart 1961, pages 393 to 406, and in C. B. Bucknall, "Toughened Plastics", Applied Science Publishers, London 1977. Preferred polymers (C) have a gel content of more than 20%, by weight, preferably more than 40%, by weight.

Preferred polymers (C) are ethylene/vinyl acetate copolymers containing from 15 to 45%, by weight, of vinyl acetate residues and having melt indices ranging from non-fluid to 1000, preferably from 0.1 to 20, as measured at 190° C. under a load of 2.16 kp in accordance with DIN 53 735.

Preferred polymers (C) are, for example, the so-called "EPM" and "EPDM" rubbers in which the ratio, by weight, of ethylene to propylene residues is from 40:60 to 90:10, preferably from 40:60 to 65:35.

The Mooney viscosities ($ML_{1+4}/100°$ C.) of the un-cross-linked EPM and EPDM rubbers are from 25 to 100, preferably from 35 to 90. The uncross-linked EPM and EPDM rubbers have gel contents of less than 1%, by weight.

The ethylene/propylene copolymers (EPM) used contain hardly any double bonds, while the ethylene/propylene/diene terpolymers (EPDM) may contain from 1 to 20 double bonds/1000 carbon atoms. Suitable diene monomers in the EPDM are, for example, conjugated dienes, for example isoprene and butadiene, and unconjugated dienes containing from 5 to 25 carbon atoms, for example, 1,4-pentadiene, 1,4-hexadiene, 1,5-hexadiene, 2,5-dimethyl-1,5-hexadiene and 1,4-octadiene; cyclic dienes, for example cyclopentadiene, cyclohexadiene, cyclooctadiene and dicyclopentadiene; alkenyl norbornenes, for example 5-ethylidene-2-norbornene, 5-butylidene-2-norbornene, 2-methallyl-5-norbornene, 2-isopropenyl-5-norbornene and tricyclodienes, for example 3-methyl-tricyclo-(5,2,1,0,2,6)-3,8-decadiene. The unconjugated dienes, 1,5-hexadiene, ethylidene norbornene or dicyclopentadiene are preferred. The diene content of the EPDM preferably amounts to from 0.5 to 10%, by weight.

EPM and EPDM rubbers of this type are described, for example, in DE-OS No. 2,808,709.

Other preferred polymers (C) are selectively hydrogenated block copolymers of an aromatic vinyl monomer (X) and a conjugated diene (Y) of the X-Y-type. Such block copolymers may be obtained by known methods.

In general, the methods used for the production of styrene-diene block copolymers which are described in "Encyclopedia of Polymer Science and Technology", Vol. 15, Interscience, N.Y. (1971), pages 508 et seq., may be used for the production of suitable X-Y-block copolymers from styrene, α-methyl styrene and vinyl toluene, for example, and conjugated dienes, such as butadiene and isoprene. The selective hydrogenation treatment may be carried out in known manner and means that the ethylenic double bonds are hydrogenated substantially completely, the aromatic double bonds remaining largely unaffected.

Such selectively hydrogenated block copolymers are described, for example, in DE-OS No. 3,000,282.

Preferred polymers (C) are polybutadienes grafted with styrene and/or acrylonitrile and/or (meth)acrylic acid alkyl esters, butadiene/styrene copolymers and poly(meth)acrylic acid esters, for example copolymers of styrene or alkyl styrenes and conjugated dienes (high-impact polystyrene), i.e. copolymers of the type described in DE-OS No. 1,694,173 (=U.S. Pat. No. 3,564,077), polybutadienes grafted with acrylic or methacrylic acid esters, vinyl acetate, acrylonitrile, styrene and/or alkyl styrenes, butadiene/styrene or butadiene/acrylonitrile copolymers, polyisobutenes or polyisoprenes of the type described, for example, in DE-OS No. 2,348,377 (≙ U.S. Pat. No. 3,919,353).

Particularly preferred polymers (C) are, for example acrylonitrile/butadiene/styrene-polymers (both copolymers and also graft polymers) of the type described for example, in DE-OS No. 2,035,390 (≙ U.S. Pat. No. 3,644,574) or in DE-OS No. 2,248,242 (≙ GB-PS No. 1,409,275).

Particularly preferred polymers (C) are, for example, graft polymers obtained by grafting:

(I) from 10 to 40%, by weight, preferably from 10 to 35%, by weight, more preferably from 15 to 25%, by weight, based on graft product, of at least one (meth)acrylic acid ester and/or of a mixture of from 10 to 35%, by weight, preferably from 20 to 35%, by weight, based on the mixture, of acrylonitrile and from 65 to 90%, by weight, preferably from 65 to 80% by weight, based on the mixture, of styrene on (II) from 60 to 90%, by weight, preferably from 65 to 90% by weight, more preferably from 75 to 85%, by weight, based on the graft product, of a butadiene polymer containing at least 70%, by weight, based on (II), of butadiene residues as the graft base, the gel content of the graft base (II) preferably amounting to ≧70% (as measured in toluene), the degree of grafting, G, to from 0.15 to 0.55 and the average particle diameter, $d_{50}$, of the graft polymer (C) to from 0.2 to 0.6 μm, preferably from 0.3 to 0.5 μm.

(Meth)acrylic acid esters (I) are esters of acrylic acid or methacrylic acid and monohydric alcohols containing from 1 to 8 carbon atoms.

In addition to butadiene residues, the graft base (II) may contain up to 30%, by weight, based on (II), of residues of other ethylenically unsaturated monomers, such as styrene, acrylonitrile, esters of acrylic or methacrylic acid containing from 1 to 4 carbon atoms in the alcohol component, such as methyl acrylate, ethyl acrylate, methyl methacrylate and ethyl methacrylate. The preferred graft base (II) is pure polybutadiene.

Since, as is known, the graft monomers (I) are not completely grafted onto the graft base (II) during the grafting reaction, graft polymers in the context of the present invention are also to be understood to be products which, in addition to the actual graft polymers, also contain homo- and co-polymers of the graft monomers (I) used.

The degree of grafting, G, is the ratio, by weight, between the monomers grafted on and the graft base and has no dimension.

The average particle diameter, $d_{50}$ is that diameter above and below which 50%, by weight, of the particles lie. It may be determined by ultracentrifuge measurements (W. Sholtan, H. Lange, Kolloid. Z. and Z. Polymere 250 (1972), 782–796) or by electron microscopy and subsequent counting of the particles (G. Kampf, H. Schuster, Angew. Makromolekulare Chemie 14, (1970), 111–129) or by light scattering measurements.

Other particularly preferred polymers (C) are, for example, graft polymers of:
(a) from 25 to 98%, by weight, based on (C), of an acrylate rubber having a glass transition temperature below $-20°$ C. as the graft base; and
(b) from 2 to 75%, by weight, based on (C), of at least one polymerisable ethylenically unsaturated monomer, of which the homo- or co-polymer(s) formed in the absence of (a) would have a glass transition temperature above $25°$ C., as the graft monomer.

The acrylate rubbers (a) of the polymers (c) are preferably polymers of acrylic acid alkyl esters, optionally containing up to 40%, by weight, of other copolymerisable, ethylenically unsaturated monomers. Providing the acrylate rubbers used as the graft base (a) are for their part graft products having a diene rubber core, as described below, the diene rubber core is not included in the calculation of this percentage. Preferred polymerisable acrylic acid esters include $C_1$–$C_8$ alkyl esters, for example methyl, ethyl, butyl, octyl and 2-ethylhexyl esters; haloalkyl esters, preferably halo-$C_1$–$C_8$ alkyl esters, such as chloroethyl acrylate and aromatic esters, such as benzyl acrylate and phenethyl acrylate. They may be used either individually or in admixture.

The acrylate rubbers (a) may be uncross-linked or cross-linked, preferably partially cross-linked.

Monomers containing more than one polymerisable double bond may be copolymerised for cross-linking. Preferred examples of cross-linking monomers are esters of unsaturated monocarboxylic acids containing from 3 to 8 carbon atoms and unsaturated monohydric alcohols containing from 3 to 12 carbon atoms or saturated polyols containing from 2 to 4 OH-groups and from 2 to 20 carbon atoms, such as ethylene glycol dimethylacrylate and allyl methacrylate; polyunsaturated heterocyclic compounds, such as trivinyl and triallyl cyanurate and isocyanurate, tris-acryloyl-s-triazines, particularly triallyl cyanurate; polyfunctional vinyl compounds, such as di- and tri-vinyl benzenes, and also triallyl phosphate and diallyl phthalate.

Preferred cross-linking monomers are allyl methacrylate, ethylene glycol dimethacrylate, diallyl phthalate and heterocyclic compounds containing at least three ethylenically unsaturated groups.

Particularly preferred cross-linking monomers are the cyclic monomers triallyl cyanurate, triallyl isocyanurate, trivinyl cyanurate, triacryloyl hexahydros-triazine and triallyl benzenes.

The cross-linking monomers are preferably used in quantities of from 0.02 to 5%, by weight, more preferably from 0.05 to 2%, by weight, based on the graft base (a).

In the case of cyclic cross-linking monomers containing at least three ethylencially unsaturated groups, it is advantageous to limit the quantity to $<1\%$, by weight, of graft base (a).

Preferred "other" polymerisable, ethylenically unsaturated monomers which, in addition to the acrylic acid esters, may optionally be used for producing the graft base (a) are, for example, acrylonitrile, styrene, α-methyl styrene, acrylamides and vinyl-$C_1$–$C_6$ alkyl ethers. Preferred acrylate rubbers as the graft base (a) are emulsion polymers having a gel content of $<60\%$, by weight. The gel content of the graft base (a) is determined in dimethyl formamide at $25°$ C. (M. Hoffmann, H. Kromer, R. Kuhn, Polymeranalytik I and II, Georg Thieme Verlag, Stuttgart 1977).

Acrylate rubbers as the graft base (a) may also be products containing a cross-linked diene rubber of one or more conjugated dienes, such as polybutadiene, or a copolymer of a conjugated diene with an ethylenically unsaturated monomer, such as styrene and/or acrylonitrile as the core.

The proportion of polydiene core in the graft base (a) may amount to from 0.1 to 80%, by weight, preferably from 10 to 50%, by weight, based on (a). The shell and core may be uncross-linked, partially cross-linked or highly cross-linked independently of one another.

Particularly preferred graft bases (a) for graft polymers (C) based on polyacrylic acid esters are summarised in the following:
(1) acrylic acid ester homo- and co-polymers without a diene rubber core and
(2) acrylic acid ester homo- and co-polymers containing a diene rubber core.

The graft yield, i.e. the quotient of the quantity of monomers (b) grafted on and the quantity of graft monomers (b) used, generally amounts to from 20 to 80%, by weight, and may be determined by the method described by M. Hoffmann, H. Kromer, R. Kuhn in Polymeranalytik, Vol. 1, Georg Thieme Verlag, Stuttgart 1977.

Preferred graft monomers (b) are α-methyl styrene, styrene, acrylonitrile, methyl methacrylate or mixtures thereof. Preferred graft monomer mixtures are mixtures of styrene and acrylonitrile in a ratio, by weight, of from 90:10 to 50:50.

Such graft polymers (C) based on polyacrylic acid esters are described, for example, in DE-AS No. 2,444,584 (=U.S. Pat. No. 4,022,748) and in DE-OS No. 2,726,256 (=U.S. Pat. No. 4,096,202).

Particularly advantageous graft polymers of this type are obtained when from 2 to 20%, by weight, preferably from 2 to 15%, by weight, based on (C), of monomer (b) is grafted onto from 80 to 98%, by weight, preferably from 85 to 97%, by weight, based on (C), of the completely broken latex, suspended in water of (a) in the absence of suspending agents. The powder-form graft polymer obtained may subsequently be dried and homogenised with the other components in the required ratio under the action of shearing forces in such a way that the average particle diameter, $d_{50}$, of (C) in the mixture according to the present invention amounts to from 0.05 to 3 μm, preferably from 0.1 to 2 μm more preferably from 0.2 to 1 μm.

The expression "in the absence of suspending agents" means the absence of substances which could be suspended in the aqueous phase, depending on the type and quantity of graft monomers (b). This definition does not exclude the presence of substances which have had a suspending effect, for example in the production of a grafted graft base (a). In such cases, the coagulant or precipitant used for breaking the latex (a) has to be added in a quantity which neutralises the suspending effect of the substances used in the preliminary stage. In other words, it is important to ensure that the graft monomers (b) do not form a (stable) emulsion in the aqueous phase.

As part of the moulding compositions according to the present invention, a graft polymer (C) produced in this way in the absence of suspending agents may be dispersed in the other resin components to an extremely small particle size which remains substantially unchanged even over prolonged processing times at elevated temperature.

The expression "extremely small particle size" means that the number, shape and size of the graft polymer particles used still correspond substantially to the number, shape and size of the graft polymer particles introduced into the other, melted resin components, even after homogenisation.

It is also possible to use as the graft base (a) acrylate rubbers of the type which accumulate in the form of an aqueous emulsion (latex) and of which the latex particles contain from 1 to 20%, by weight, preferably from 1 to 10%, by weight, based on (a), of monomers already grafted on in aqueous emulsion of which the homo- or co-polymers would have glass transition temperatures of $>0°$ C.

Preferred grafted-on monomers of this type are alkyl acrylates, alkyl methacrylates, styrene, acrylonitrile, α-methyl styrene and/or vinyl acetate.

Graft bases (a) of this type are produced, for example, by emulsion polymerisation or by emulsion graft polymerisation. However, they may also be obtained by preparing an acrylate rubber by solution or bulk polymerisation, subsequently grafting on the graft monomers and then converting the rubbers into an aqueous emulsion which is suitable for further grafting processes.

Accordingly, in addition to the polymers listed above, other suitable graft bases (a) for acrylate rubbers according to this particular embodiment are graft polymers, produced in aqueous emulsion, of acrylic acid ester homo- or co-polymers optionally containing a diene rubber core and ethylenically unsaturated polymerisable monomers.

In order to increase the resistance thereof to gasoline, the moulding compositions according to the present invention may contain up to 5 parts, by weight, of ethylene homo- or co-polymer. Ethylene copolymers suitable for this purpose are polyethylenes up to 30%, by weight, based on ethylene copolymer, of which consist of residues of other copolymerisable monomers in addition to ethylene residues. Other copolymerisable monomers for the production of these ethylene copolymers are, for example, the monomers mentioned above with reference to the production of the graft base and the graft monomer for polymer (C).

The moulding compositions according to the present invention may contain conventional additives, such as lubricants and mould release agents, nucleating agents, stabilisers, fillers and reinforcing materials, flameproofing agents and dyes.

The filled or reinforced moulding compositions may contain up to 60%, by weight, based on the reinforced moulding composition, of fillers and/or reinforcing materials. Preferred reinforcing materials are glass fibres. Preferred fillers, which may also have a reinforcing effect, are glass beads, mica, silicates, quartz, talcum, titanium dioxide and wollastonite.

The flameproofed polyester moulding compositions generally contain flameproofing agents in a concentration of less than 30%, by weight, based on the flameproofed moulding compositions.

It is possible to use various known flame-proofing agents, such as polyhalogenated diphenyl, polyhalogenated diphenyl ether, polyhalogenated phthalic acid and derivatives thereof and polyhalogenated oligocarbonates and polycarbonates, the corresponding bromine compounds being particularly effective. In addition, they generally contain a synergist, such as antimony trioxide.

The moulding compositions may be produced in the conventional mixing units, such as mixing rolls, kneaders, single-screw and multiple-screw extruders.

The moulding compositions according to the present invention may be processed into mouldings which undergo very little distortion, even in the event of prolonged temperature stressing.

Although in most cases all the resin components are preferably mixed in a single step, it may also be advisable in some cases initially to leave out one or even two components and to add it (them) at a later stage.

It has been found that mixtures which do not contain the polymer (C) may be used as "intermediates" for the production of the above-described moulding compositions according to the present invention, and may even be processed themselves to form mouldings characterised by excellent properties. Compared with mouldings of mixtures according to the present invention containing polymer (C), these mouldings are not as tough, but show greater dimensional stability to heat and greater longterm stability to heat.

Preferred moulding compositions of this type contain:

(A) from 5 to 95 parts, by weight, of polyalkylene terphthalate; and (B) from 5 to 95 parts, by weight, of aromatic polycarbonate; the quantities of components (A) and (B) totalling 100 parts, by weight, and from 2 to 90%, by weight, preferaably from 3 to 15%, by weight, of the aromatic polycarbonate (B) consisting of o,o,o',o'-tetramethyl bisphenol polycarbonate.

It has also been found that mixtures of polyalkylene terephthalate and tetramethyl bisphenol-A-polycarbonate are suitable "intermediates" for the above-described moulding compositions according to the present invention, but may also be processed themselves to form substantially distortion-free, optionally glass fibre-reinforced mouldings characterised by high dimensional stability to heat and a relatively low coefficient of thermal expansion.

Preferred moulding compositions of this type contain:

(A) from 5 to 95 parts, by weight, preferably from 20 to 80 parts, by weight, more preferably from 50 to 70 parts, by weight of polyalkylene terephthalate; and (B) from 5 to 95 parts, by weight, preferably from 20 to 80 parts, by weight, more preferably from 30 to 50 parts, by weight, of o,o,o',o'-tetramethyl bisphenol polycarbonate.

These moulding compositions are eminently suitable, for example, for the production of headlight reflectors.

The parts quoted in the following Examples represent parts, by weight, while the percentages quoted represent percentages, by weight.

EXAMPLES

Components used:

(I) A polycarbonate of bisphenol-A, phenol and phosgene, relative viscosity 1.285, as measured on a 0.5% solution in dichloromethane at 25° C.

(II) A polycarbonate of o,o,o′,o′-tetramethyl bisphenol-A, phenol and phosgene, relative viscosity 1.29, as measured on a 0.5% solution in dichloromethane at 25° C.

(III) A polybutylene terephthalate having an intrinsic viscosity of 1.18 dl/g, as measured in phenol/o-dichlorobenzene (ratio, by weight, 1:1) at 25° C. using an Ubbelohde viscometer.

(IV) A polybutylene terephthalate having an intrinsic viscosity of 0.92 dl/g measured in the same way as for (III).

(V) A polyethylene terephthalate having an intrinsic viscosity of 0.78 dl/g measured in the same way as for (III).

(VI) A terpolymer of ethylene, acrylic acid and t-butyl acrylate in a ratio, by weight, of 89:4:7 having a melt index of 6–8 g/10 mins (as measured at 190° C. under a load of 2.16 kp in accordance with DIN 53 735) and a density of 0.924 g/cc (as measured in accordance with DIN 53 479).

(VII) A graft polymer consisting of 80% of a graft base of cross-linked polybutadiene (gel content above 70%, as measured in toluene) and 20% of graft monomer of methyl methacrylate.

(VIII) A graft polymer of 80% of a graft base of cross-linked polybutadiene (gel content above 70%, as measured in toluene) and 20% of a graft monomer of 72 parts of styrene and 28 parts of acrylonitrile.

(IX) A core-shell-type graft polymer having the following composition (expressed in the ratios, by weight, between its constituent monomers): n-butyl acrylate/1,3-butane diol diacrylate/diallyl maleate/methyl methacrylate = 79.2:0.4:0.4:20.0.

(X) A core-shell-type graft polymer produced by the following multistage process.

(1) Production of the graft base (1.1) Production of a polybutadiene latex

An emulsion having the following composition is polymerised with stirring at 65° C. in a reactor until the monomers have been completely converted (which takes about 22 hours):
100 parts of butadiene,
1.8 parts of the sodium salt of disproportionated abietic acid,
0.257 part of sodium hydroxide
0.3 part of n-dodecyl mercaptan,
1.029 part of sodium ethylene diamine tetraacetate,
0.023 part of potassium persulphate and
176 parts of water.

A latex is obtained which contains polybutadiene particles having an average diameter ($d_{50}$) of 0.1 μm in a concentration of approximately 36%.

(1.2) Production of an acrylate rubber containing polydiene cores:

The following mixture is introduced into a reactor with stirring at 63° C.:
200 parts of latex 1.1,
5000 parts of water,
14 parts of potassium persulphate,
0.9124 part of triallyl cyanurate and
399.09 parts of n-butyl acrylate The following mixtures are then separately introduced into the reactor over a period of 5 hours at 63° C.:

| Mixture 1: | 90 | parts of Na—$C_{14}$-$C_{18}$ alkyl sulphonate and |
| | 11900 | parts of water |
| Mixture 2: | 23.09 | parts of triallyl cyanurate and |
| | 10101 | parts of n-butyl acrylate |

The mixture is then left to polymerise for 2 hours at 65° C. The polymers formed have gel contents of from 85 to 95% and average particle diameters ($d_{50}$) of 0.5 μm (polymer content in the latex: 38%).

(2.1) Production of the emulsion graft polymers (2.1.1) An emulsion graft polymer of 90% of acrylate rubber (1.2) and 10% of styrene + acrylonitrile.
3296 parts of latex (1.2),
1.5 parts of potassium persulphate and
90 parts of water
are introduced into a reactor. The following mixtures are separately introduced into the reactor at 65° C.:

| Mixture 1: | 39 parts of acrylonitrile and |
| | 100 parts of styrene, |
| Mixture 2: | 150 parts of water and |
| | 4 parts of Na—$C_{14}$-$C_{18}$ alkyl sulphonate |

The reaction mixture is left to polymerise for 4 hours at 65° C. (polymer content of the latex: 37.8%).

(2.2) Production of the graft polymer (C) from the emulsion graft polymer:
18800 parts of water and
240 parts of $MgSO_4 \times 7H_2O$
are introduced into a reactor at 70° C. 11,200 parts of latex (2.1.1) are run into the reactor over a period of 2 hours with stirring.

On completion of the addition, 1 part of potassium persulphate is introduced into the reactor, after which 148 parts of acrylonitrile and 381 parts of styrene are uniformly introduced with stirring over a period of 1 hour. The suspension is then stirred for 1 hour at 90° C., after which polymer (C) is isolated.

Production of the moulding compositions

The components (parts, by weight, see following Table) were melted and homogenised under nitrogen in a twin-screw extruder. The barrel temperature was adjusted in such a way as to guarantee the melt temperature shown in the Table. The melt strand of the mixtures according to the present invention was degassed before leaving the extrusion nozzle, cooled in water, granulated and dried. Processing was carried out in an ejection moulding machine.

TABLE 1

| Example No. | \multicolumn{10}{c}{Components [parts, by weight]} | Melt temp. Extruder [°C.] | Injection moulding [°C.] | Mould temp. [°C.] |
| | I | II | III | IV | V | VI | VII | VIII | IX | X | | | |
|---|---|---|---|---|---|---|---|---|---|---|---|---|---|
| 1 | 54 | 4 | 35 | — | — | 2 | — | — | 5 | — | 288 | 270 | 60 |
| 2 | 54 | 4 | 35 | — | — | 2 | — | 5 | — | — | 278 | 270 | 60 |
| 3 | 54 | 4 | 35 | — | — | — | — | 7 | — | — | 285 | 270 | 60 |
| 4 | 50 | 8 | — | — | 35 | — | — | 7 | — | — | 289 | 270 | 60 |

TABLE 1-continued

| Example No. | Components [parts. by weight] | | | | | | | | | | Melt temp. Extruder [°C.] | Injection moulding [°C.] | Mould temp. [°C.] |
|---|---|---|---|---|---|---|---|---|---|---|---|---|---|
| | I | II | III | IV | V | VI | VII | VIII | IX | X | | | |
| 5 | 54 | 4 | 20 | — | 15 | — | 7 | — | — | — | 289 | 270 | 60 |
| 6 | 54 | 4 | 35 | — | — | — | — | — | — | 7 | 288 | 290 | 60 |
| 7 | — | 10 | 56 | — | — | — | 25 | — | — | — | 287 | 260 | 80 |
| 8 | — | 20 | 55 | — | — | — | 25 | — | — | — | 291 | 260 | 80 |
| 9 | — | 20 | — | 55 | — | — | 25 | — | — | — | 289 | 260 | 80 |
| 10 | — | 10 | 35 | — | 30 | — | 25 | — | — | — | 293 | 260 | 80 |

All the mouldings showed distinctly less distortion by comparison with mouldings which did not contain component (II).

Production of the moulding compositions

Granulate mixtures of components (II) and (III) were introduced without further homogenisation into an injection moulding machine in which they were injection-moulded to form standard small test bars on which the linear thermal expansion coefficient was measured at 105° C.

TABLE 2

| Example | Components (II) (III) [parts. by weight] | | Linear expansion coefficient [mm/m · K] |
|---|---|---|---|
| 11 | 10 | 90 | 0.140 |
| 12 | 30 | 70 | 0.125 |
| 13 | 50 | 50 | 0.095 |
| 14 | 70 | 30 | 0.080 |

The reinforced moulding compositions described in the following were produced using the same compositions as indicated in Table 1, except that glass fibres in the form of chopped strands 6 mm long and 10 μm in diameter were introduced into the melt of the resin components.

| Example | Components [parts. by weight] (II) (IV) glass | | | Melt temperature extruder [°C.] | injection moulding [°C.] | Mould temperature [°C.] |
|---|---|---|---|---|---|---|
| 15 | 7 | 63 | 30 | 293 | 260 | 80 |
| 16 | 13.9 | 56.1 | 30 | 300 | 260 | 80 |

The mouldings obtained show remarkably little distortion for high dimensional stability to heat and a low coefficient of thermal expansion.

We claim:

1. Thermoplastic moulding compositions comprising (A) from 1 to 80 parts, by weight, of polybutylene terephthalate,
(B) from 20 to 99 parts, by weight, of bisphenol-A polycarbonate having an average molecular weight of from 10,000 to 200,000 as determined by measurement of the relative viscosity in dichloromethane at 25° C. using a concentration of 0.5%, by weight; polycarbonate (B) containing from 2 to 20%, by weight, based on (B), of o,o,o',o'-tetramethyl bisphenol-A polycarbonate and
(C) from 1 to 20 parts, by weight, of a polymer having a glass transition temperature below −20° C. selected from the group consisting of
(i) graft polymers obtained by grafting
(I) from 10 to 40%, by weight, based on the graft product, of monomers selected from the group consisting of (a) at least one (meth)acrylic acid ester, (b) a mixture of from 10 to 35%, by weight, based on the mixture, of acrylonitrile and from 65 to 90%, by weight, based on the mixture, of styrene, and mixtures of (a) and (b) on
(I) from 60 to 90%, by weight, based on the graft product, of a butadiene polymer containing at least 70%, by weight, based on (II), of butadiene residues as the graft base, the gel content of the graft base (II) amounting to ≧70% (as measured in toluene), the degree of grafting, G, to from 0.15 to 0.55 and the average particle diameter, $d_{50}$, of the graft polymer (C) to from 0.2 to 0.6 μm, and
(ii) graft polymers of
(a) from 25 to 98%, by weight, based on (C), of an acrylate rubber having a glass transition temperature below −20° C. as the graft base; and
(b) from 2 to 75%, by weight, based on (C), of at least one polymerisable ethylenically unsaturated monomer, of which the homo- or co-polymer(s) formed in the absence of (a) would have a glass transition temperature above 25° C., as the graft monomer, the quantities of components (A), (B), and (C) totalling 100 parts, by weight.

2. Molding compositions as claimed in claim 1, wherein (C) is a graft polymer obtained by grafting
(I) from 10 to 40% by weight, based on the graft product, of monomers selected from the group consisting of (a) at least one (meth)acrylic acid ester, (b) a mixture of from 10 to 35%, by weight, based on the mixture, of acrylonitrile and from 65 to 90%, by weight, based on the mixture, of styrene, and mixtures of (a) and (b) on
(II) from 60 to 90%, by weight, based on the graft product, of a butadiene polymer containing at least 70%, by weight, based on (II), of butadiene residues as the graft base, the gel content of the graft base (II) amounting to ≧70% (as measured in toluene), the degree of grafting, G, to from 0.15 to 0.55 and the average particle diameter, $d_{50}$, of the graft polymer (C) to from 0.2 to 0.6 μm.

3. Molding compositions as claimed in claim 1, wherein (C) is a graft polymer of
(a) from 25 to 98%, by weight, based on (C), of an acrylate rubber having a glass transition temperature below −20° C. as the graft base; and
(b) from 2 to 75%, by weight, based on (C), of at least one polymerisable ethylenically unsaturated monomer, of which the homo- or co-polymer(s) formed in the absence of (a) would have a glass transition temperature above 25° C., as the graft monomer, the quantities of components (A), (B), and (C) totalling 100 parts, by weight.

4. Moulding compositions as claimed in claim 1, characterised in that they contain:
from 20 to 80 parts, by weight, of (A);
from 20 to 80 parts, by weight, of (B); and
from 1 to 20 parts, by weight, of (C);
the quantities of components (A), (B) and (C) totalling 100 parts, by weight.

5. Moulding compositions as claimed in claim 1, characterised in that they are glass fibre-reinforced.

* * * * *

UNITED STATES PATENT AND TRADEMARK OFFICE
CERTIFICATE OF CORRECTION

PATENT NO. : 4,515,918
DATED : MAY 7, 1985
INVENTOR(S) : NOUVERTNE' ET AL

It is certified that error appears in the above-identified patent and that said Letters Patent is hereby corrected as shown below:

On the cover page, under "Inventors:", please change "Sivara Krishnai" to read --Sivaram Krishnan--.

Signed and Sealed this

Thirteenth Day of August 1985

[SEAL]

Attest:

DONALD J. QUIGG

Attesting Officer  Acting Commissioner of Patents and Trademarks